(12) United States Patent
Watanabe et al.

(10) Patent No.: US 10,516,858 B2
(45) Date of Patent: Dec. 24, 2019

(54) MONITORING SYSTEM, MONITORING METHOD, AND PROGRAM

(71) Applicant: Panasonic Intellectual Property Management Co., Ltd., Osaka (JP)

(72) Inventors: Masao Watanabe, Fukuoka (JP); Takahiro Yoshimura, Fukuoka (JP); Akihiro Nawata, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 85 days.

(21) Appl. No.: 15/832,629

(22) Filed: Dec. 5, 2017

(65) Prior Publication Data

US 2018/0184051 A1    Jun. 28, 2018

(30) Foreign Application Priority Data

Dec. 28, 2016    (JP) .................. 2016-256845

(51) Int. Cl.

| H04N 7/18 | (2006.01) |
|---|---|
| G08G 5/00 | (2006.01) |
| G08G 1/04 | (2006.01) |
| H04N 5/232 | (2006.01) |
| B64C 39/02 | (2006.01) |

(Continued)

(52) U.S. Cl.
CPC .......... *H04N 7/188* (2013.01); *B64C 39/024* (2013.01); *G08B 13/19602* (2013.01); *G08B 13/19621* (2013.01); *G08B 13/19656* (2013.01); *G08B 25/08* (2013.01); *G08G 1/04* (2013.01); *G08G 1/205* (2013.01); *G08G 5/0078* (2013.01); *H04N 5/23206* (2013.01); *H04N 5/247* (2013.01); *H04N 7/181* (2013.01); *B64C 2201/127* (2013.01); *B64C 2201/145* (2013.01)

(58) Field of Classification Search
USPC .......................................................... 348/144
See application file for complete search history.

(56) References Cited

U.S. PATENT DOCUMENTS

| 8,571,895 | B1 * | 10/2013 | Medina, III | ........... G06Q 40/08 |
|---|---|---|---|---|
| | | | | 705/4 |
| 2006/0095199 | A1 * | 5/2006 | Lagassey | ............... G07C 5/008 |
| | | | | 701/117 |

(Continued)

FOREIGN PATENT DOCUMENTS

JP    5925130 B1    9/2016

*Primary Examiner* — Behrooz M Senfi
(74) *Attorney, Agent, or Firm* — Seed IP Law Group LLP

(57) ABSTRACT

A plurality of fixed cameras installed in a driving area on a highway and a server device are connected via a network NW. The server device displays the captured images of the fixed cameras on the fixed camera monitor and requests camera position information and zooming position information to respective fixed cameras in response to occurrence of a traffic accident or the like in the driving area. In response to this request, the fixed cameras transmit the camera position information and the zooming position information to the server device. Based on camera position information and zooming position information, the server device derives the occurrence position of a traffic accident or the like, instructs a predetermined drone to capture the image around the occurrence position such as a traffic accident, and displays the captured image transmitted from the drone on a drone monitor.

18 Claims, 10 Drawing Sheets

(51) Int. Cl.
*H04N 5/247* (2006.01)
*G08G 1/00* (2006.01)
*G08B 13/196* (2006.01)
*G08B 25/08* (2006.01)

(56) References Cited

U.S. PATENT DOCUMENTS

2017/0178476 A1\* 6/2017 Jeon ................. G08B 13/19656
2018/0152673 A1\* 5/2018 Kim .................. H04N 5/23206
2018/0157259 A1\* 6/2018 Myslinski .............. G08B 21/18

\* cited by examiner

MONITORING SYSTEM, MONITORING METHOD, AND PROGRAM

BACKGROUND

1. Technical Field

The present disclosure relates to a monitoring system, a monitoring method, and a program for monitoring an imaging area to be imaged by a camera device.

2. Description of the Related Art

In some cases, when monitoring an imaging area to be imaged with a camera device (for example, a monitoring camera), it is sometimes desirable to confirm the details of a monitoring target point. For example, in a case where an incident (for example, accident) occurs at a monitoring target point, in a monitoring camera (so-called PTZ camera) equipped with pan, tilt and zooming functions, it is possible to capture images of the monitoring target point to some extent by changing magnification and an angle of view.

Here, as an example of the related art, an unmanned aerial vehicle equipped with a camera device for capturing images close to the monitoring target point is known (see, for example, Japanese Patent No. 5999537).

Even with the monitoring camera in the related art, it is possible to capture images of the monitoring target point to some extent by using the pan, tilt and zooming functions described above, for example. However, since it is only possible to capture images from one direction seen from the monitoring camera, for example, it was not possible to promptly confirm the details of the situation near the monitoring target point or the surrounding area by, for example, orbiting the monitoring target point (for example, a road). For example, in a case where an incident such as an accident occurs, if it is possible to grasp the details of the situations of the monitoring target point (for example, an accident site) at an early stage, it will be possible to investigate countermeasures in advance as to what kind of countermeasures should be taken before an ambulance arrives at the accident site to respond promptly after arriving at the accident site.

In addition, in the unmanned aerial vehicle of Japanese Patent No. 5999537, since it is not considered to cooperate with the captured images of the monitoring camera (for example, a monitoring camera installed on a road which is a monitoring target point), in the case as described above (for example, when an accident occurred on a road), it was not possible to arrive at an accident site immediately and obtain detailed images of the site immediately after the accident, and usability was not good.

SUMMARY

In view of the above-described circumstances in the related art, an object of the present disclosure is to provide a monitoring system, a monitoring method, and a program capable of promptly checking details of a monitoring target point in a case where an incident occurs and improving a user's usability.

The present disclosure provides a monitoring system which includes a plurality of camera devices installed in an imaging area and a server device that is connected to the camera devices via a network, in which the server device displays the captured image of an imaging area captured by the camera device on a display and requests information on the camera device to the camera device in response to occurrence of an incident around the imaging area, the camera device transmits the information on the camera device to the server device in response to the request, and the server device derives an occurrence position of the incident based on the information on the camera device transmitted from the camera device, further instructs a predetermined unmanned aerial vehicle to capture an image around the derived occurrence position of the incident, and acquires the image captured in the vicinity of the occurrence position of the incident captured by the unmanned aerial vehicle from the unmanned air vehicle to display the image on the display.

In addition, the present disclosure provides a monitoring method in a monitoring system which includes a plurality of camera devices installed in an imaging area a server device that is connected to the camera devices via a network, the method including displaying a captured image of an imaging area captured by the camera device on a display, requesting information on the camera device to the camera device in response to occurrence of an incident around the imaging area by the server device, transmitting the information on the camera device to the server device in response to the request by the camera device; deriving an occurrence position of the incident based on the information on the camera device transmitted from the camera device, instructing a predetermined unmanned aerial vehicle to capture an image around the occurrence position of the derived incident, and acquiring the captured image in the vicinity of the occurrence position of the incident imaged by the unmanned aerial vehicle from the unmanned air vehicle, and displaying the captured image on the display by the server device.

In addition, the present disclosure provides a program causing a server device, which is a computer and connected to a plurality of camera devices installed in an imaging area via a network, to realize the steps of: displaying a captured image of the imaging area imaged by the camera device on a display, requesting information on the camera device to the camera device in response to occurrence of an incident around the imaging area; deriving an occurrence position of the incident based on the information on the camera device transmitted from the camera device in response to the request; instructing a predetermined unmanned aerial vehicle to capture an image around the occurrence position of the derived incident; and acquiring the captured image in the vicinity of the occurrence position of the incident imaged by the unmanned aerial vehicle from the unmanned aerial vehicle and displaying the captured image on the display.

According to the present disclosure, in a case where an incident occurs, the details of the monitoring target point may be checked promptly, and usability for a user may be improved.

DETAILED DESCRIPTION

In the following, embodiments of a monitoring system, monitoring method, and a program according to the present disclosure will be described in detail with reference to drawings as appropriate. However, detailed explanation more than necessary may be omitted. For example, detailed explanation of already well-known matters and redundant explanation on substantially the same configuration may be omitted. This is to avoid unnecessary redundancy of the following description and to facilitate understanding by those skilled in the art. The accompanying drawings and the following explanation are provided to enable those skilled in the art to sufficiently understand the present disclosure and are not intended to limit the claimed subject matter.

Embodiment 1

Figure 1:
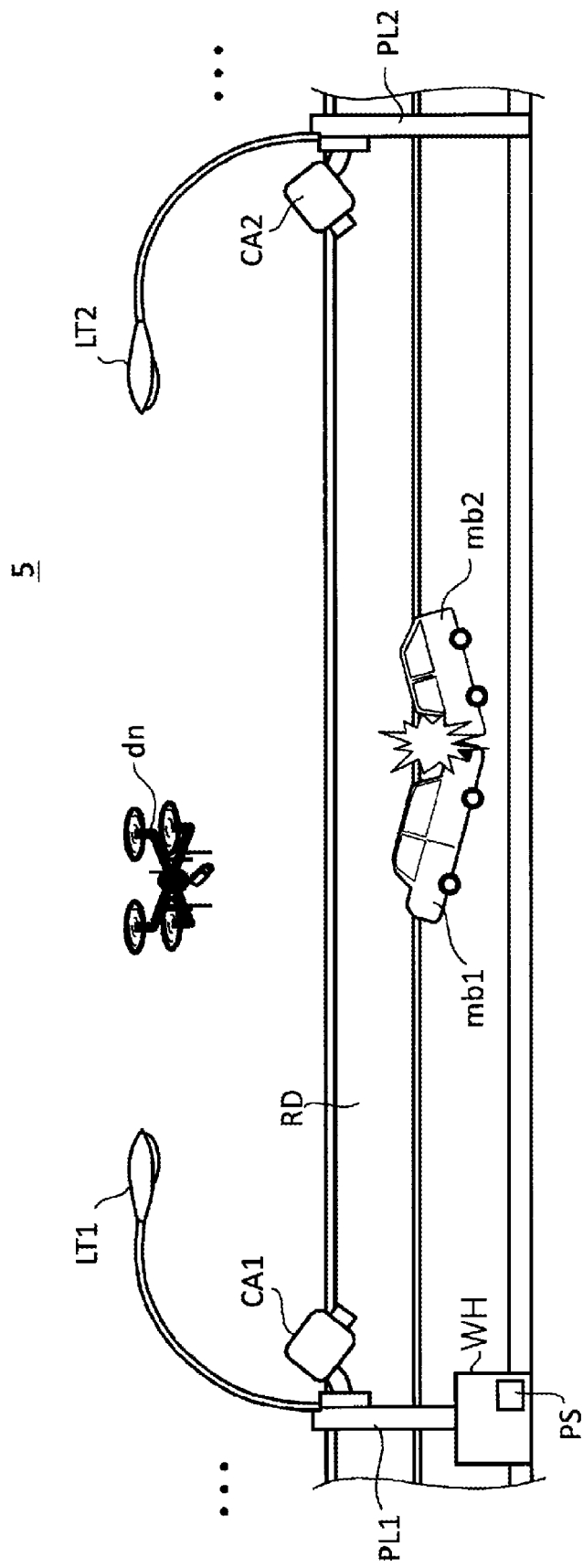
FIG. 1 is an explanatory diagram showing an example of an operation outline of a monitoring system according to Embodiment 1.

FIG. 1 is an explanatory diagram showing an example of an operation outline of monitoring system 5 of Embodiment 1. Monitoring system 5 of Embodiment 1 exemplifies a case where highway RD is monitored as a monitoring target point. It goes without saying that a road serving as the monitoring target point may be a general road and is not limited to a highway and even a road.

At the side of the road of highway RD, a plurality of poles PL1, PL2 . . . are installed at equal intervals. In particular, in a case where poles PL1, PL2 . . . are not distinguished, the poles are collectively referred to as pole PL. Overhang type lighting devices (an example of the lighting device) LT1, LT2 . . . for illuminating a driving area on highway RD are attached to respective poles PL. In particular, in a case where lighting devices LT1, LT2, . . . are not distinguished, the lighting devices are collectively referred to as lighting device LT. In addition, fixed cameras CA1, CA2 . . . that monitor a predetermined driving area on highway RD as an imaging area are attached to respective pole PL. In particular, in a case where fixed cameras CA1, CA2 . . . are not distinguished, the fixed cameras are collectively referred to as fixed camera CA.

In addition, storage unit WH is attached to pole PL1 installed at the side of the road on highway RD. In storage unit WH, drone dn which is an unmanned aerial vehicle (UAV) and charger PS which supplies power drone dn in a wired or wireless manner are deployed. In FIG. 1, storage unit WH is attached to pole PL 1, but the place where storage unit WH is placed may be a side wall or the like installed at the side of the highway RD road. In addition, an arbitrary number of storage units WH may be installed at arbitrary positions on highway RD. In addition, the number of drone dn accommodated in one storage unit WH may be any number. For example, in a junction where an accident is likely to occur, the number of drone dn may be increased, in a case where a plurality of vehicles are involved in a traffic accident such as multiple collisions, a plurality of drones dn may capture images of the vicinity of the plurality of vehicles at the same time.

Here, as an example, it is assumed that two vehicles mb1 and mb2 cause a frontal collision accident at highway RD. The frontal collision accident of two vehicles occurs as a result of a case where a running vehicle enters an opposite lane beyond a median strip and goes backward by mistaking an entrance and exit in a service area or the like.

Figure 2:
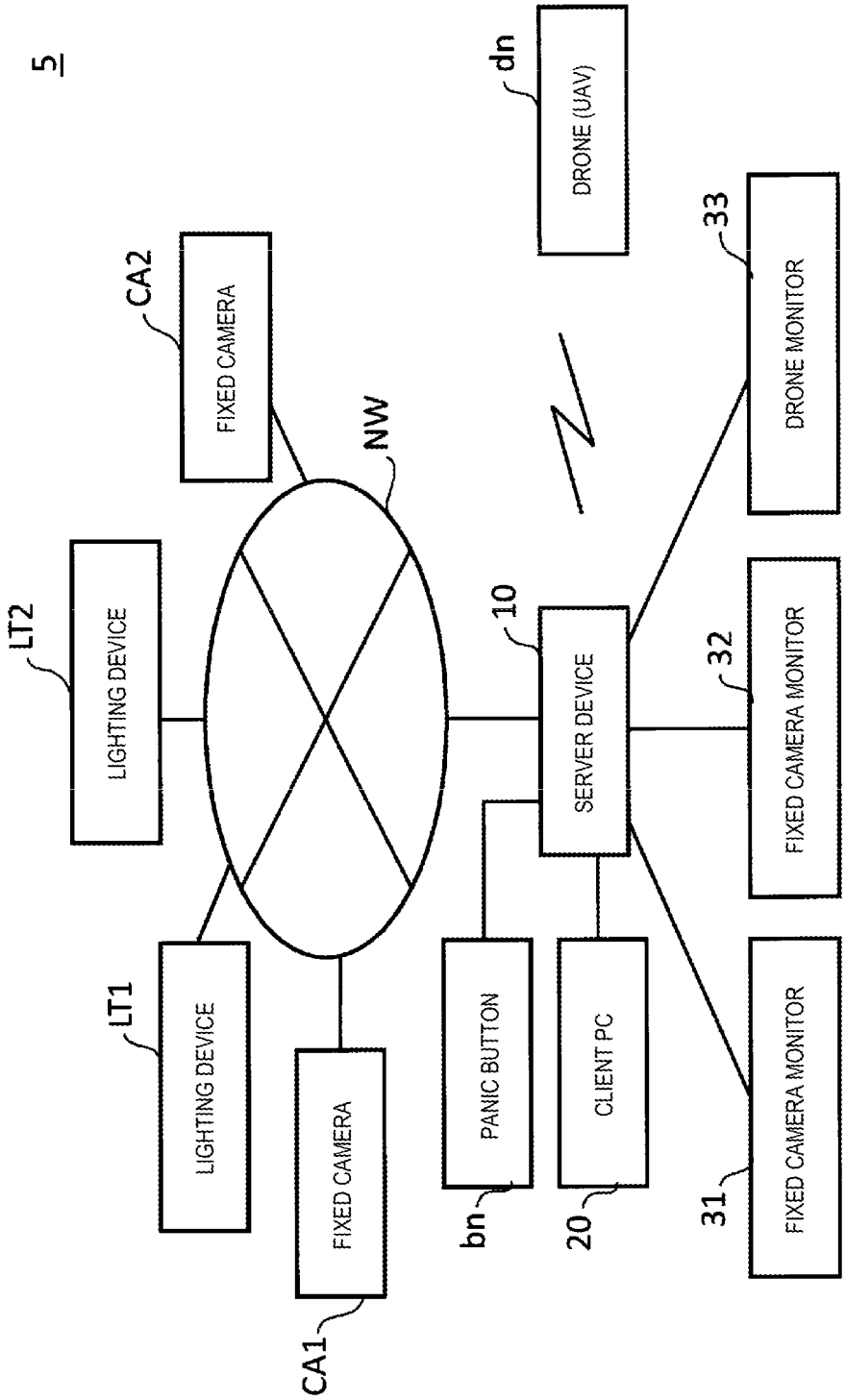
FIG. 2 is a block diagram showing an example of a system configuration of the monitoring system.

FIG. 2 is a block diagram showing an example of a system configuration of monitoring system 5. Monitoring system 5 has a configuration in which server device 10, a plurality of fixed cameras CA (CA1, CA2 . . . ), and a plurality of lighting devices LT (LT1, LT2 . . . ) are connected to network NW. In addition, monitoring system 5 includes client PC 20 connected to server device 10, fixed camera monitors 31 and 32, drone monitor 33, and panic button bn. In addition, monitoring system 5 includes drone dn wirelessly connected to server device 10 via a wireless local area network (LAN, for example, Wifi (registered trademark)).

Figure 3:
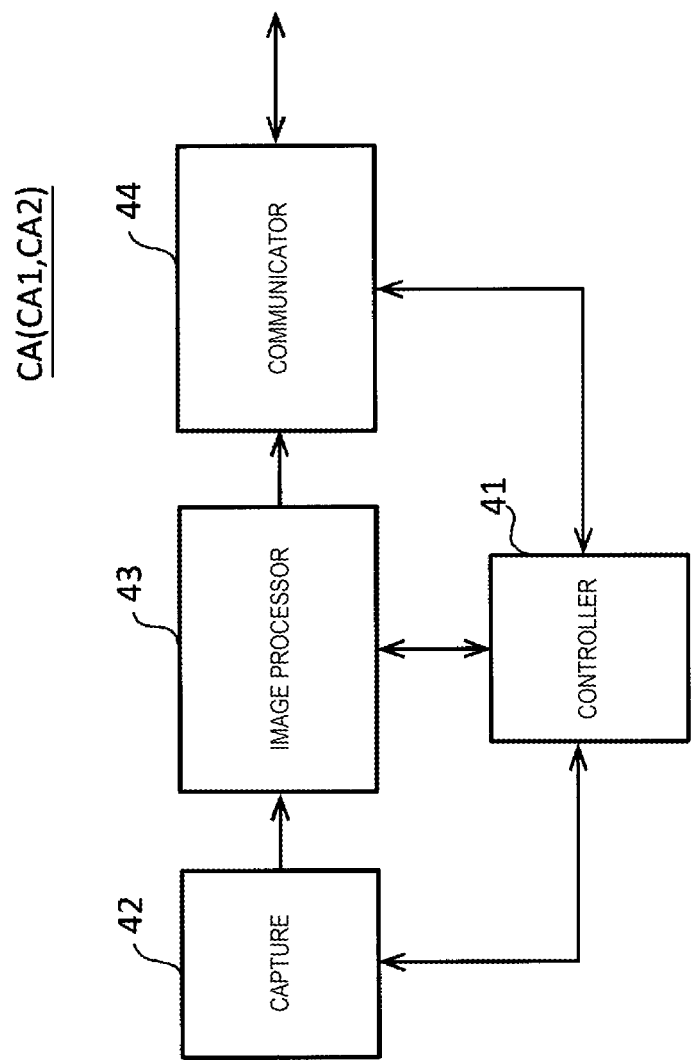
FIG. 3 is a block diagram showing an example of an internal configuration of a fixed camera.

FIG. 3 is a block diagram showing an example of an internal configuration of fixed camera CA. Fixed camera CA is a camera in which an imaging direction is predefined so as to capture a predetermined driving area on highway RD as an imaging area. In the present embodiment, fixed camera CA includes a zooming function capable of adjusting an imaging angle of view. Fixed camera CA includes at least controller 41, capture 42, image processor 43, and communicator 44.

Controller 41 includes, for example, a central processing unit (CPU), a micro processing unit (MPU), a digital signal processor (DSP), or the like and controls the operation of fixed camera CA. When there is a request for information on the camera device from server device 10, controller 41 may notify server device 10 of the position information and the zoom position information of fixed camera CA as an example of the information on the camera device via communicator 44.

Capture 42 includes an optical lens, a lens control mechanism, an image sensor, and the like. The optical lens images a subject image on the image sensor. The lens control mechanism includes a zooming mechanism that changes a focal length by moving the optical lens in an optical axis direction. Here, the zooming function is optical zooming by the zooming mechanism, but may include at least one of optical zooming and electronic zooming. The image sensor is a charge coupled device (CCD) sensor or a complementary metal-oxide semiconductor (CMOS) sensor. The image sensor includes an element capable of receiving near infrared rays for nighttime imaging in addition to an element capable of receiving visible light.

Image processor 43 is constituted by an application specific integrated circuit (ASIC), a digital signal processor (DSP), and the like and performs predetermined camera signal processing, image compression processing, and the like in fixed camera CA. Image processor 43 may be provided in controller 41.

Communicator 44 connects to network NW in a wired or wireless manner and transmits information on the camera device (for example, camera position information and zooming position information as imaging conditions of the camera) to server device 10 in response to a request from server device 10. Here, the camera position information and the zooming position information are exemplified as the information relating to the camera device, but in a case where feature information of a subject is included in the image captured by the camera device (that is, fixed camera CA), the camera position information and the zooming position information may be the feature information of the subject. In a case where fixed camera CA transmits the feature information of the subject, server device 10 may transmit the feature information of the subject to drone dn and track the subject.

In the present embodiment, fixed camera CA is used, but instead of fixed camera CA, even if a PTZ camera capable of panning, tilting, and zooming or an omnidirectional camera capable of capturing an omnidirectional image is may be used.

Figure 4:
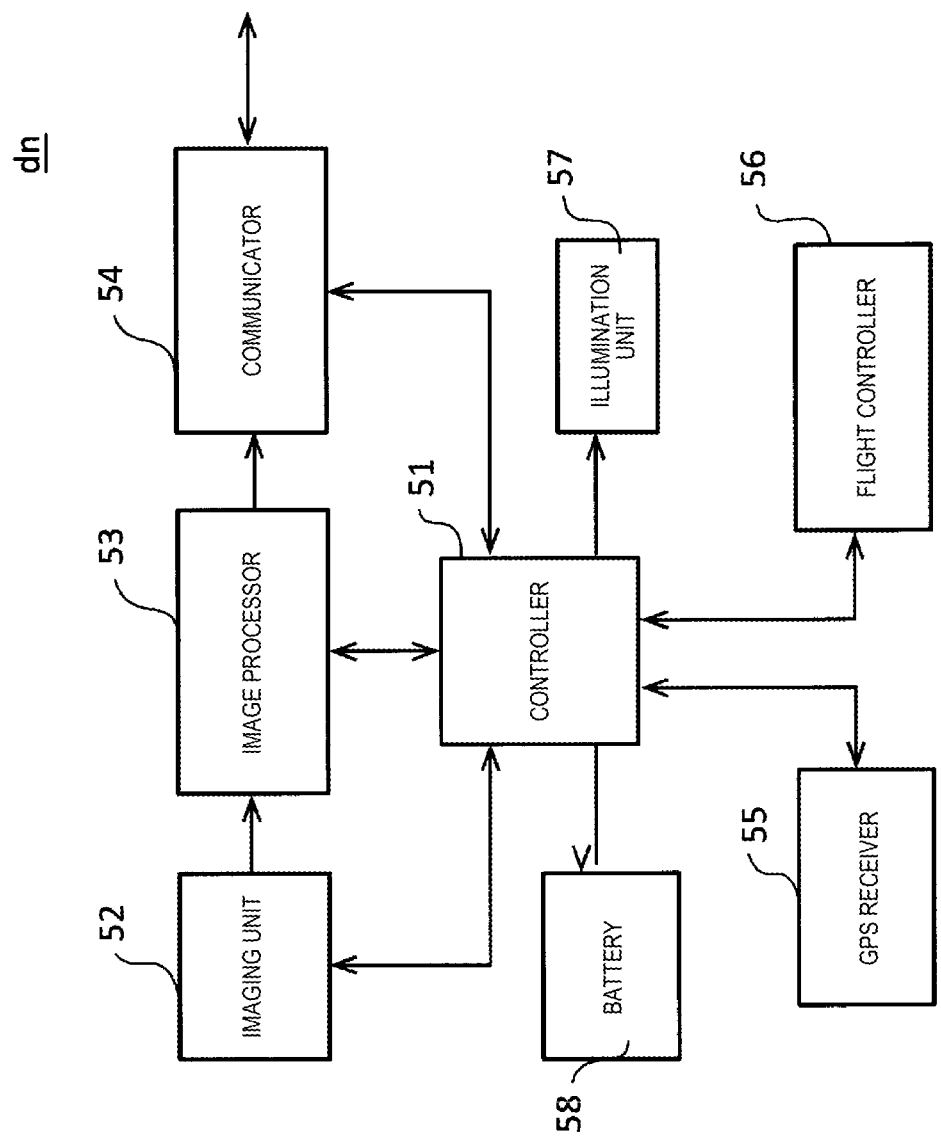
FIG. 4 is a block diagram showing an example of an internal configuration of a drone (UAV)

FIG. 4 is a block diagram showing an example of an internal configuration of drone (UAV) dn. Drone dn performs autonomous flight (including, for example, starting, rotating of rotating blades (not shown), rising, descending, left turning, right turning, advancing, and retreating) in accordance with an instruction from server device 10 and captures the image of the subject in capture 52. Drone dn includes at least controller 51, capture 52, image processor 53, communicator 54, global positioning system (GPS) receiver 55, flight controller 56, illumination unit 57, and battery 58.

Controller 51 is constituted by, for example, a CPU, an MPU, a DSP or the like and totally controls the movement of drone dn and the operation (processing) of respective units. Controller 51 may cause drone dn to track an imaging target by using a feature amount extracted by image processor 53. In addition, during the flight of drone dn, controller 51 detects the remaining capacity of battery 58 and instructs flight controller 56 to autonomously return to storage unit WH in which charger PS is accommodated.

Capture 52 includes an optical lens, a lens control mechanism, an image sensor, and the like. The optical lens captures a subject image on the image sensor. The lens control mechanism includes a zooming mechanism that changes a focal length by moving the optical lens in an optical axis direction. Here, the zooming function is optical zooming by the zooming mechanism, but may include at least one of optical zooming and electronic zooming. The image sensor is a CCD sensor or a CMOS sensor. For example, when the drone dn arrives at an accident site that is a destination, capture 52 starts imaging. Drone dn captures an image while turning around the accident site and then captures an image by approaching the accident site.

Image processor 53 is constituted by, for example, an ASIC, a DSP, and the like and extracts feature amounts (for example, color information and the like) of a person or the like appearing in a captured image in addition to predetermined camera signal processing and image compression processing in drone dn.

Communicator 54 wirelessly connects to server device 10 using a wireless LAN or the like. That is, drone dn may transmit and receive data to and from server device 10 if the drone is within a communicable range such as a wireless LAN. Wireless connection may be public radio instead of a wireless LAN.

GPS receiver 55 receives GPS signals (that is, signals including information of the transmission time of the signal, the position (that is, latitude, longitude, altitude) of a GPS satellite) transmitted from a plurality of GPS satellites and calculates the current position of drone dn using the GPS signals from the plurality of GPS satellites. The information on the current position includes latitude, longitude, and altitude, but at least latitude and longitude is sufficient. In a case where altitude information is included, when drone dn flies, it is also possible to make the drone fly so that the drone will not get caught by electric wires and the like.

Flight controller 56 controls the flight of the drone. Control relating to flight includes, for example, propeller (rotary blade) control, control of rising, descending, left turning, right turning, advancing, retreating, hovering, and the like.

Illumination unit 57 uses light emission diode (LED), a halogen lamp, a xenon lamp or the like as a light source and projects directional light. Illumination unit 57 illuminates an accident site or the like by being lightened in a case where the surroundings are dark, such as at night. Illumination unit 57 may include a dimming function for adjusting the brightness in accordance with an instruction from controller 51.

Battery 58 is a power supply for drone do and is a rechargeable secondary battery, for example, a lithium ion battery, a lithium ion polymer secondary battery, or the like.

Figure 5:
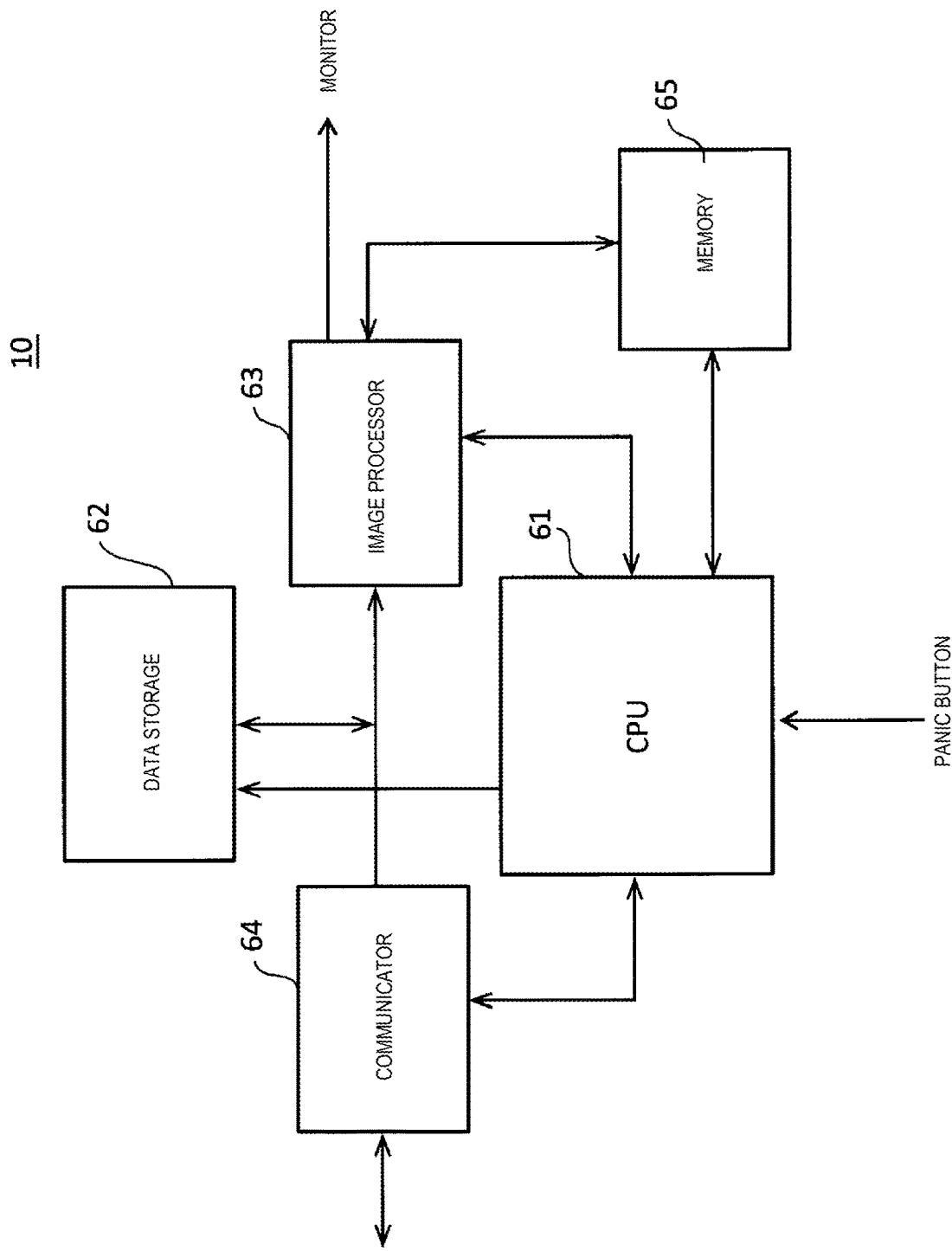
FIG. 5 is a block diagram showing an example of an internal configuration of a server device.

FIG. 5 is a block diagram showing an example of an internal configuration of server device 10. Server device 10 performs control processing for totally supervising monitoring system 5, input and output processing of data with other parts, and storage processing of data and includes CPU 61, data storage 62, image processor 63, communicator 64, and memory 65.

When detecting the input of a signal indicating that panic button bn is pressed by a user (for example, a surveillance person of highway RD located at a monitoring center in Embodiment 1), CPU 61 calculates a position where the incident occurred based on the camera position information and the zooming position information acquired from fixed camera CA1. For example, CPU 61 analyzes the captured image of the imaging area, detects a marker included in the captured image, acquires the position information (latitude and longitude) of the marker in advance from a database registered in data storage 62, thereby identifying an incident occurrence position. In the method of specifying the incident occurrence position in CPU 61, the above-described method is merely an example and not limited to that method.

Data storage 62 is configured to use, for example, a flash memory, hard disk drive (HDD) or solid state drive (SSD) and stores image data and the like captured by fixed camera CA and drone dn.

Image processor 63 decompresses the compressed image captured by fixed camera CA and drone dn and converts the image data captured by fixed camera CA and drone dn into display data suitable for a display format of fixed camera monitors 31 and 32, and drone monitor 33.

Communicator 64 is connected to network NW in a wired or wireless manner and is capable of communicating with fixed cameras CA1, CA2, and lighting devices LT1 and LT 2, and also may communicate with drone dn via a wireless LAN or the like.

Memory 65 is constituted by using, for example, a random access memory (RAM), a read only memory (ROM), a nonvolatile or volatile semiconductor memory, functions as a work memory at the time of operation of CPU 61 or image processor 63, and stores a predetermined program and data for operating CPU 61 or image processor 63.

Figure 6:
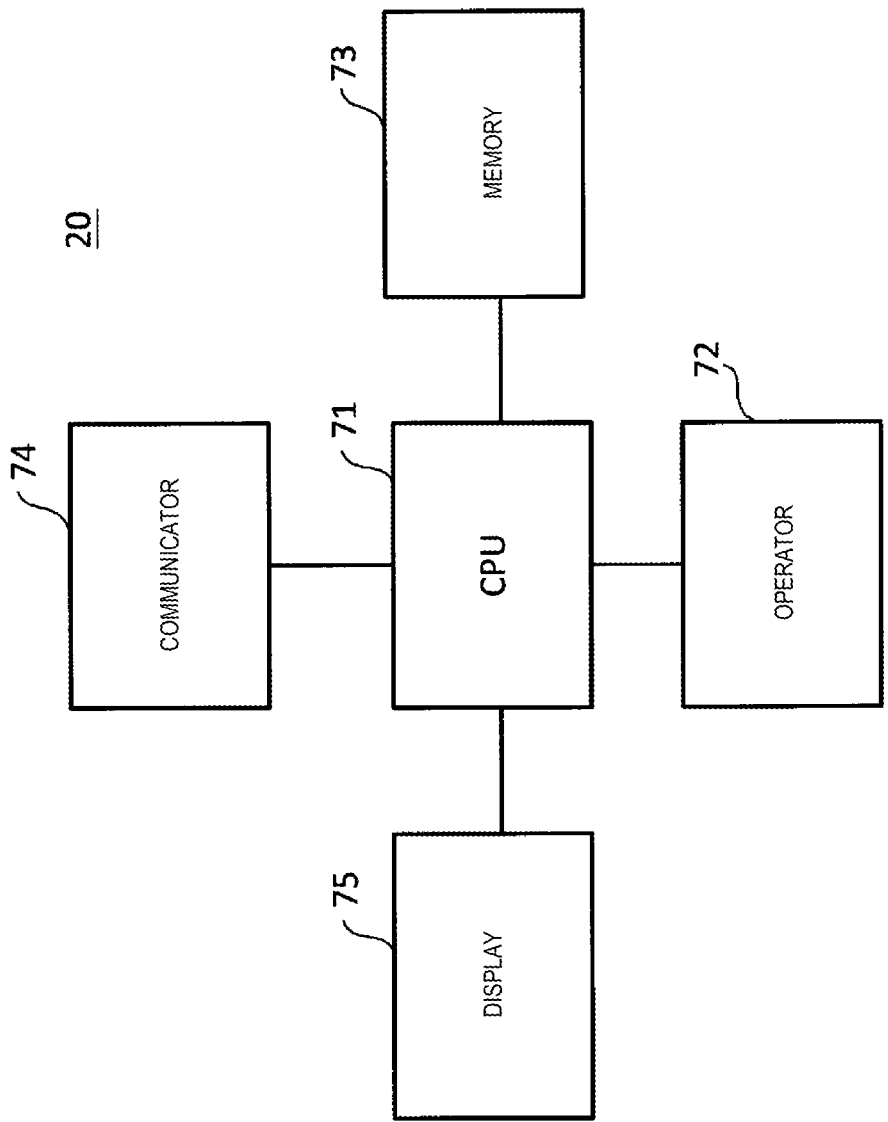
FIG. 6 is a block diagram showing an example of an internal configuration of a client PC.

FIG. 6 is a block diagram showing an example of an internal configuration of client PC 20. Client PC 20 is installed and used at, for example, a command center of a police station that has jurisdiction over the vicinity of highway RD which is the monitoring target point or a monitoring center of a highway management company and is connected to server device 10 in a wired or wireless manner. The client PC 20 is a PC which may be operated by a police officer belonging to the above-described command center or a surveillance person resident in the above monitoring center and includes at least CPU 71, operator 72, memory 73, communicator 74, and display 75.

CPU 71 controls the operation of client PC 20 in accordance with the program and data stored in memory 73.

Operator 72 is configured to use, for example, a mouse and a keyboard and outputs a signal corresponding to an input operation by the user (that is, the described above police officer or surveillance person) to CPU 71. In addition, operator 72 accepts a selection operation of the user (that is, the above-described police officer or surveillance person) with respect to the panic button (for example, an icon) displayed on display 75 and outputs a signal indicating that the panic button is selected to CPU 71.

Memory 73 is configured to use, for example, a RAM, a ROM, a nonvolatile or volatile semiconductor memory, functions as a work memory at the time of operation of the CPU 71, and stores a predetermined program and data for operating CPU 71.

Communicator 74 is directly connected to server device 10 in a wired or wireless manner and transmits a signal indicating that the panic button (for example, an icon) displayed on display 75 is selected by the described above user to server device 10.

Display 75 displays a screen of a dedicated application for monitoring the situation of highway RD and further displays the panic button or the like (for example, an icon) used for requesting an emergency response in accordance with the occurrence of an incident in this screen.

In monitoring system 5, panic button bn as a hardware-type press button switch is connected to network NW in addition to the panic button such as an icon displayed on display 75 of client PC 20. When panic button bn is pressed by a manual operation (pressing operation) by the user, an emergency response request signal is transmitted to server device 10.

Figure 7:
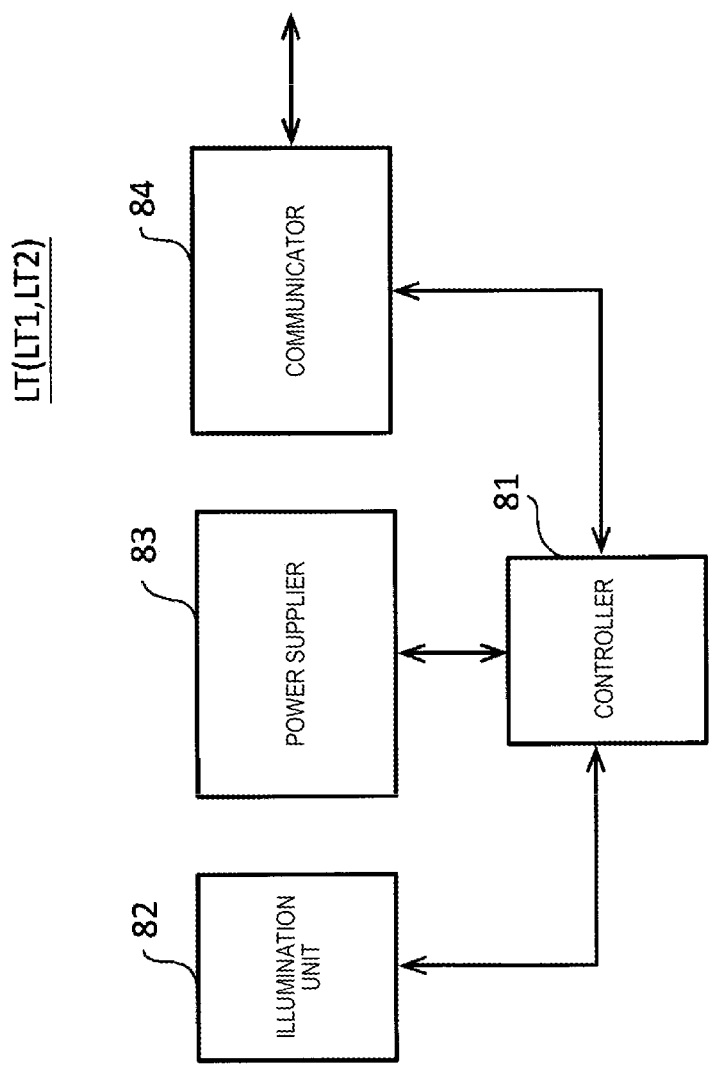
FIG. 7 is a block diagram showing an example of an internal configuration of a lighting device.

FIG. 7 is a block diagram showing an example of an internal configuration of lighting device LT. Lighting device LT illuminates the driving area on highway RD. Lighting device LT includes at least controller 81, illumination unit 82, power supplier 83, and communicator 84.

Controller 81 is configured to use, for example, a microcomputer and lights illumination unit 82 in accordance with a lighting instruction from server device 10.

Illumination unit 82 uses a fluorescent lamp, a mercury lamp, an LED, a halogen lamp, a xenon lamp, a white light bulb, or the like as a light source to illuminate the accident site or the like by being lightened in a case where the surroundings are dark, such as at night. In addition, for example, in a case where illumination unit 82 is constituted by a large number of point light sources arranged along a curved surface, lighting device LT may be switched in a range from a region close to pole PL to a region far from pole PL to which lighting device LT is attached for illumination. In addition, illumination unit 82 may be controlled by controller 81 as a search light so as to illuminate the place to be captured by drones dn. In addition, illumination unit 82 may include a dimming function for adjusting the brightness in accordance with an instruction from controller 81.

Power supplier 83 supplies electric power to illumination unit 82 and controller 81 by using commercial AC power as a power source and may additionally charge battery 58 of drone dn in accordance with an instruction from controller 81.

Communicator 84 is connected to network NW in a wired or wireless manner and may communicate with server device 10.

Next, an operation procedure of monitoring system 5 of Embodiment 1 will be described in detail with reference to FIG. 8. For example, a case where the police officer belonging to the command center of the police station or the surveillance person who resides in the monitoring center of the highway management company monitors highway RD will be exemplified and explained.

Figure 8:
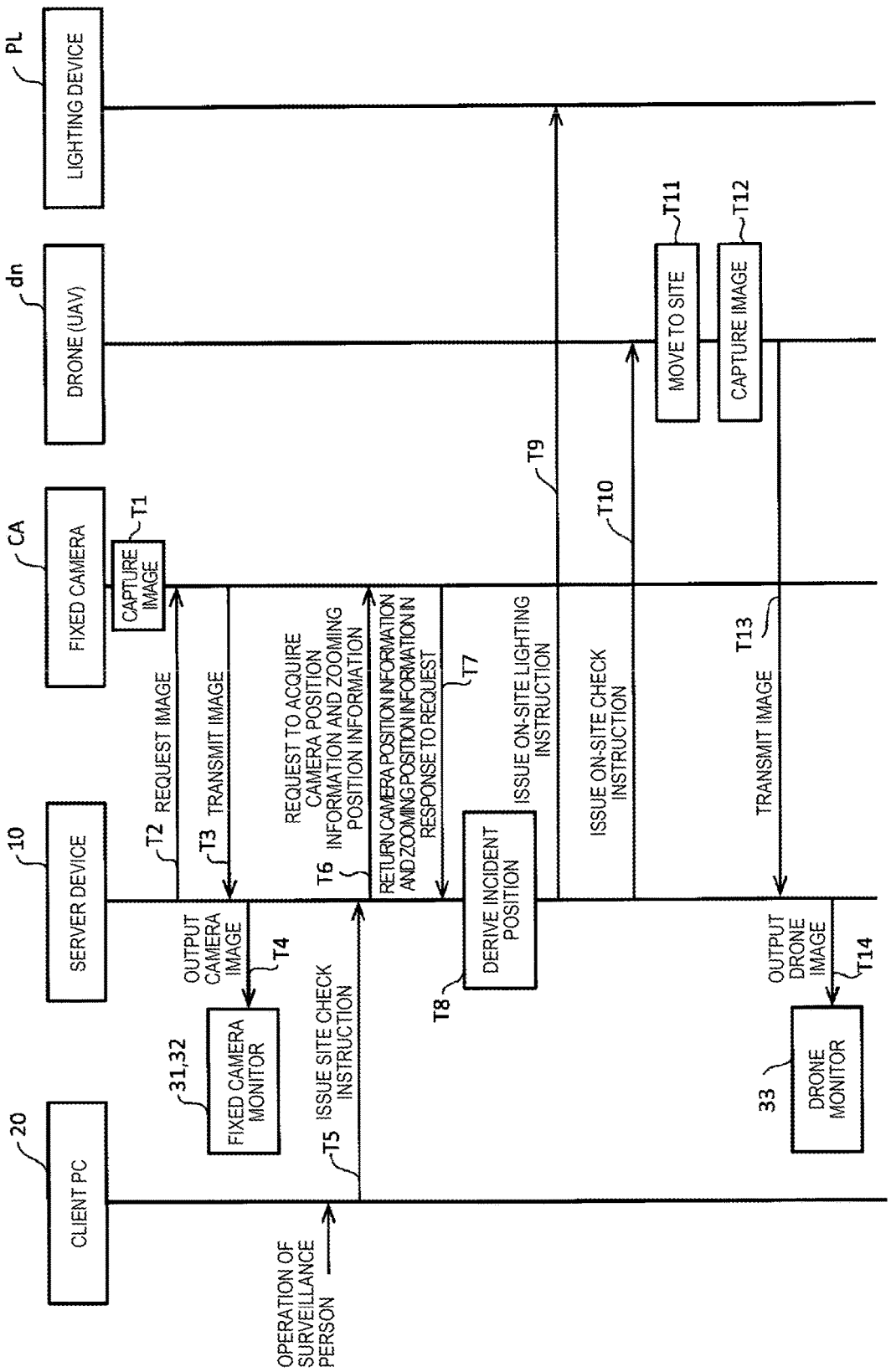
FIG. 8 is a sequence diagram showing an example of a monitoring operation procedure in the monitoring system according to Embodiment 1 in detail.

FIG. 8 is a sequence diagram showing an example of a monitoring operation procedure in monitoring system 5 of Embodiment 1. In FIG. 8, fixed camera CA is illustrated, but one fixed camera CA1 may be used or a plurality of fixed cameras CA1 and CA2 may be used.

In FIG. 8, when monitoring system 5 is activated, first, a plurality of fixed cameras CA (CA1, CA2 . . . ) start to capture images of respective driving areas on highway RD (T1). As described above, a plurality of fixed cameras CA are installed at equal intervals in highway RD. Therefore, monitoring by a plurality of fixed cameras CA (CA1, CA2 . . . ) is always performed.

Server device 10 requests captured images from a plurality of fixed cameras CA (CA1, CA2 . . . ) (T2). In response to this request, the plurality of fixed cameras CA (CA1, CA2 . . . ) transmit the captured images to server device 10 (T3).

When receiving the captured images transmitted from fixed cameras CA (for example, fixed cameras CA1 and CA2) respectively, server device 10 outputs the captured images to fixed camera monitors 31 and 32 (T4). Fixed camera monitor 31 displays the image captured by the fixed cameras CA1, and fixed camera monitor 32 displays the image captured by fixed camera CA2. In a case where only one fixed camera CA1 is used, fixed camera monitor 31 may display the image captured by fixed camera CA1, and the fixed camera monitor 32 may not be used or the image captured by the fixed camera CA1 may be similarly displayed in a clone.

When monitoring the images displayed on the fixed camera monitors 31 and 32 and finds the occurrence (incident) of a traffic accident or the like, the surveillance person determines from the situation that on-site check is necessary. Here, a case where the incident occurrence position appears in the captured image by the fixed camera CA1 is shown. The surveillance person selects the panic button displayed on the screen of client PC 20. In accordance with the selection operation of this panic button, client PC 20 issues an on-site check instruction to server device 10 (T5).

Instead of the selection operation of the panic button displayed on the screen of client PC 20, panic button bn connected to server device 10 may be pressed as a press button switch. In addition, instead of the surveillance person finding the occurrence (incident) of a traffic accident or the like visually, server device 10 analyzes the captured image transmitted from the fixed camera CA, and for example, in a case where there is a large change in a difference image (for example, an orange-colored image region that evokes fire spreads), the occurrence of a traffic accident or the like (that is, occurrence of an incident) may be estimated. In addition, the surveillance person may determine the occurrence of an incident as a result of an emergency call from the accident site.

Server device 10 requests fixed camera CA to acquire camera position information and zooming position information as imaging conditions of the camera (T6). Here, the camera position information is position information of fixed camera CA1, and the zooming position information is zooming position information of fixed camera CA1. In response to this request, fixed camera CA returns camera position information and zooming position information to server device 10 (T7). Based on the camera position information and the zooming position information transmitted from the fixed camera CA, server device 10 derives incident position information where an incident occurred (T8). In the derivation of the incident position information, for example, server device 10 analyzes the captured image of the imaging area, detect the marker included in the captured image, and acquire the position information (latitude and longitude) of the marker from the database registered in advance, thereby identifying an incident occurrence position. In addition, server device 10 may calculate the incident position information from the ratio of an object having a known shape close to the incident position to the imaging angle of view by geometrical calculation using the camera position information and the zooming position information. Here, the incident position information may include altitude in addition to latitude and longitude.

Based on this incident position information, server device 10 selects lighting device LT capable of illuminating the site near the incident position and issues an on-site lighting instruction (T9). Lighting device LT illuminates when receiving the on-site lighting instruction. For example, in a case where it is determined that the surroundings of the site where the incident occurred are bright by the time of day or illumination, server device 10 may not issue an on-site lighting instruction device to lighting device LT. In addition, in a case where the surroundings where the incident occurred are bright, even if there is an on-site lighting instruction from server device 10, lighting device LT may determine by the time of day or illuminance by itself and may remain off without the instruction from server device 10. One lighting device LT is provided so as to form a pair with one fixed camera.

Server device 10 issues an on-site check instruction to predetermined drone dn (that is, drone dn that is arranged at a predetermined position) (T10). The on-site check instruction includes incident position information (latitude and longitude) at which drone dn is supposed to capture images and an instruction indicating that drone dn turns around the incident position information. Altitude information may be included. When receiving the on-site check instruction from server device 10, drone dn starts flight and moves to the site (accident site) based on the incident position information (latitude and longitude) (T11). When arriving at the accident site while starting capturing of an image, drone dn captures an image while approaching or orbiting and turns around the accident site (T12), and continues to transmit captured images in the vicinity including the accident site (that is, near the incident occurrence position) to server device 10 (T13).

Server device 10 outputs the captured images transmitted from drone dn to drone monitor 33 (T14). Drone monitor 33 displays the images captured by drone dn. The surveillance person determines whether or not urgent on-site dispatch is necessary by determining the presence or absence of an injured person or the like by looking at the images displayed on drone monitor 33. In a case where the surveillance person determines to head for urgent on-site dispatch, the surveillance person may urgently inform the police officer or a life-saving person riding in an ambulance of the situation of the accident site, the condition of an injured person, and the like and contribute to life saving.

In this way, in monitoring system 5 of the first embodiment, at least one fixed camera CA installed in a driving area (imaging area) on highway RD and server device 10 (server device) are connected via network NW. Server device 10 displays the captured images of fixed camera CA on fixed camera monitors 31 and 32 (displays) and requests the camera position information and the zooming position information (information on the camera) as the imaging conditions of the camera to fixed camera CA in response to the occurrence of a traffic accident or the like (incident) in driving area. In response to this request, fixed camera CA transmits the camera position information and the zooming position information to server device 10. Based on the camera position information and the zooming position information transmitted from fixed camera CA, server device 10 derives the occurrence position of a traffic accident or the like (incident), further instructs drone dn (unmanned airplane) to capture the image around the occurrence position of the derived incident, and displays the captured image (second captured image) transmitted from drone dn on drone monitor 33.

In this way, in a case where an accident occurs on a highway, the captured images of the accident site may be promptly transmitted to the command center of the police station or the monitoring center of the highway management company, and the surveillance person may check details of the accident site. For example, in the case of a frontal collision between vehicles, the surveillance person may immediately grasp the presence or absence of injured persons such as drivers and passengers. In addition, the surveillance person, along with the arrangement of ambulances, may inform a life-saving person of the state of an injured person, thereby leading to life saving. In this way, in a case where an incident occurs, details of a monitoring target may be checked.

In addition, the information on the camera is an imaging condition of the camera that captures an image of the incident occurrence position. As a result, server device 10 may inform drone dn of the incident occurrence position derived by using the imaging conditions (camera position information and zooming position information) of the camera transmitted from fixed camera CA. Drone dn may head urgently to the location where the incident occurred.

In addition, monitoring system 5 includes a plurality of lighting devices LT (lighting devices). Server device 10 instructs lighting device LT near the incident occurrence position to be lightened. As a result, lighting device LT may illuminate the location where a traffic accident or the like (incident) occurred, and the image captured by drone dn becomes clearer.

In addition, server device 10 recognizes the occurrence of an incident according to the selection operation of the panic button (predetermined button) displayed on the screen of client PC 20. As a result, it is possible to easily and promptly inform server device 10 of occurrence of an incident such as a traffic accident, and usability is improved.

The incident on the road may be not only an accident such as a frontal collision or a collision between vehicles but also a reverse car, a falling object on a road, a discovery of a bicycle entering a highway, and for such an incident, the monitoring system of this embodiment is effective. In addition, not only for an incident on a road, but also for a general disaster such as a fire or collapse occurring in the vicinity of a road, in the monitoring system of the present embodiment, it is also possible to start the unmanned aerial vehicle and transmit captured images of the site quickly.

Embodiment 2

In Embodiment 2, the monitoring system indicates a case of monitoring stores such as convenience stores and mass merchandisers. In the related art, in a case where a robbery occurred at a cashier in a store, although a criminal was shown in the captured image by an in-store camera, the details were difficult to understand. Especially, the image when a criminal left a door was not captured by the in-store camera, and the direction of getaway of the criminal was also unknown. For this reason, it was difficult to identify and arrest the criminal promptly. In Embodiment 2, the image when a criminal left a door is captured, thereby checking the details of the criminal.

Figure 9:
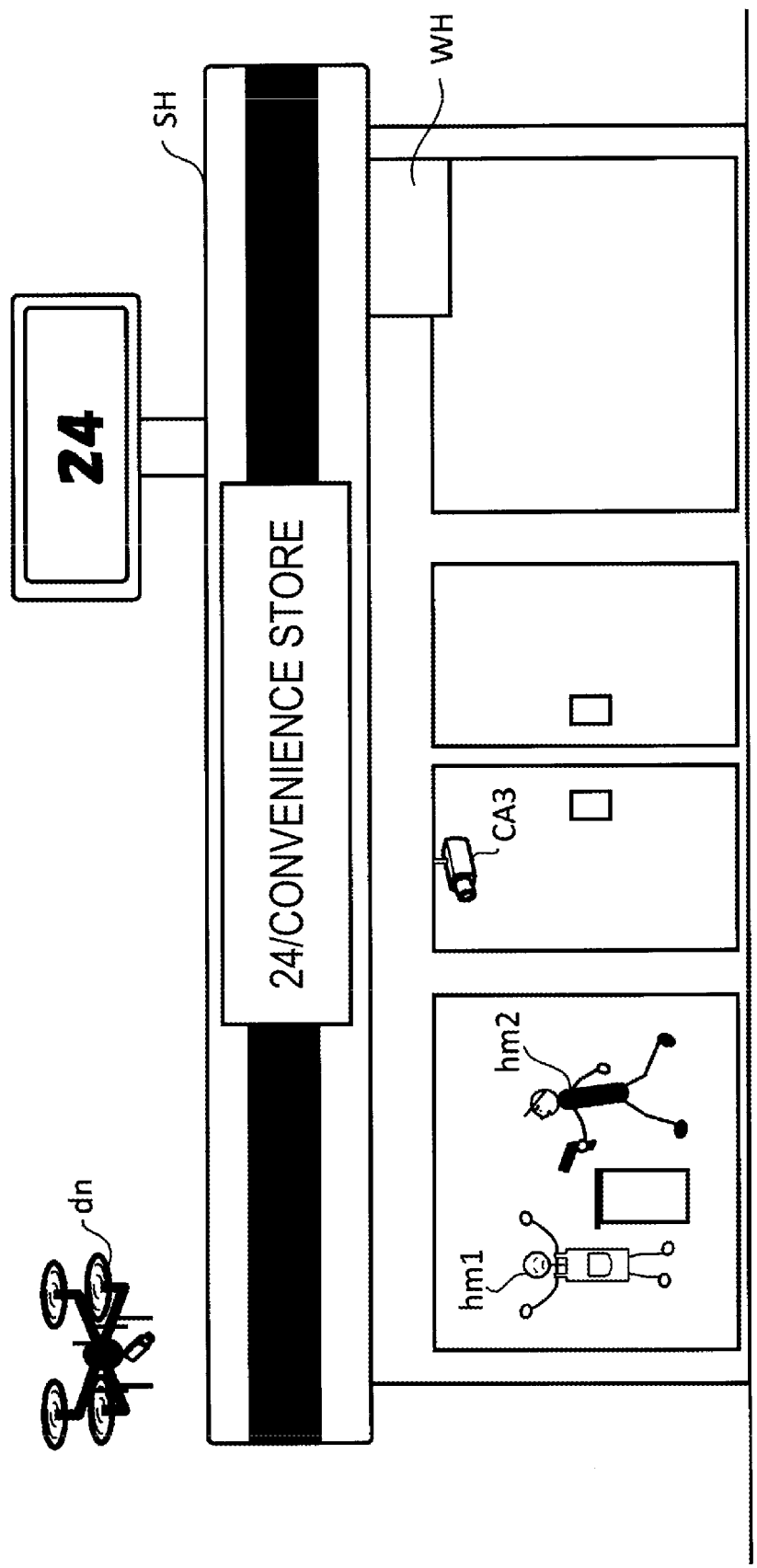
FIG. 9 is an explanatory diagram showing an example of an operation outline of the monitoring system according to Embodiment 2.

FIG. 9 is an explanatory diagram showing an example of an operation outline of monitoring system 5 in Embodiment 2. In-store cameras CA3 and drone dn are provided assuming an incident such as a robbery occurring at a cash register and shoplifting occurring at shop SH. In-store camera CA3 constantly captures images near the cash register. In addition, drone dn is stored in storage unit WH installed at the eaves of the store or the like and waits. Drone dn may wait in a parking lot or structure located in a neighboring place away from the store.

Monitoring system 5 of Embodiment 2 has the same configuration as monitoring system 5 of Embodiment 1. The same reference numerals are used for the same constituent elements as those in Embodiment 1, and the explanation thereof will be omitted. However, in Embodiment 2, fixed camera CA is used as in-store camera CA3. In addition, fixed camera monitor 31 is used as in-store camera monitor 34.

Monitoring system 5 has a configuration in which server device 10 and a plurality of in-store cameras CA3 are connected to network NW. In-store camera CA3 is a camera with a fixed angle of view so as to capture an image of the vicinity of the register. In-store camera CA3 may be an omnidirectional camera capable of imaging the whole store or a PTZ camera capable of imaging the inside of the store in an arbitrary direction. In addition, here, a case where in-store camera CA3 is one is shown, but may be plural depending on the size of the store.

Server device 10 includes a large-capacity data storage (storage) and also serves as a recorder function capable of recording image data imaged by in-store camera CA3. Server device 10 may be a recorder capable of recording and storing a lot of image data. In addition, server device 10 may be a cloud server that is not installed in the store and connected to a monitoring center via a network.

In addition, monitoring system 5 includes drone do wirelessly connected to server device 10 via a wireless LAN or the like. Monitoring system 5 includes in-store camera monitor 34, drone monitor 33, and panic button bn, which are connected to server device 10.

Figure 10:
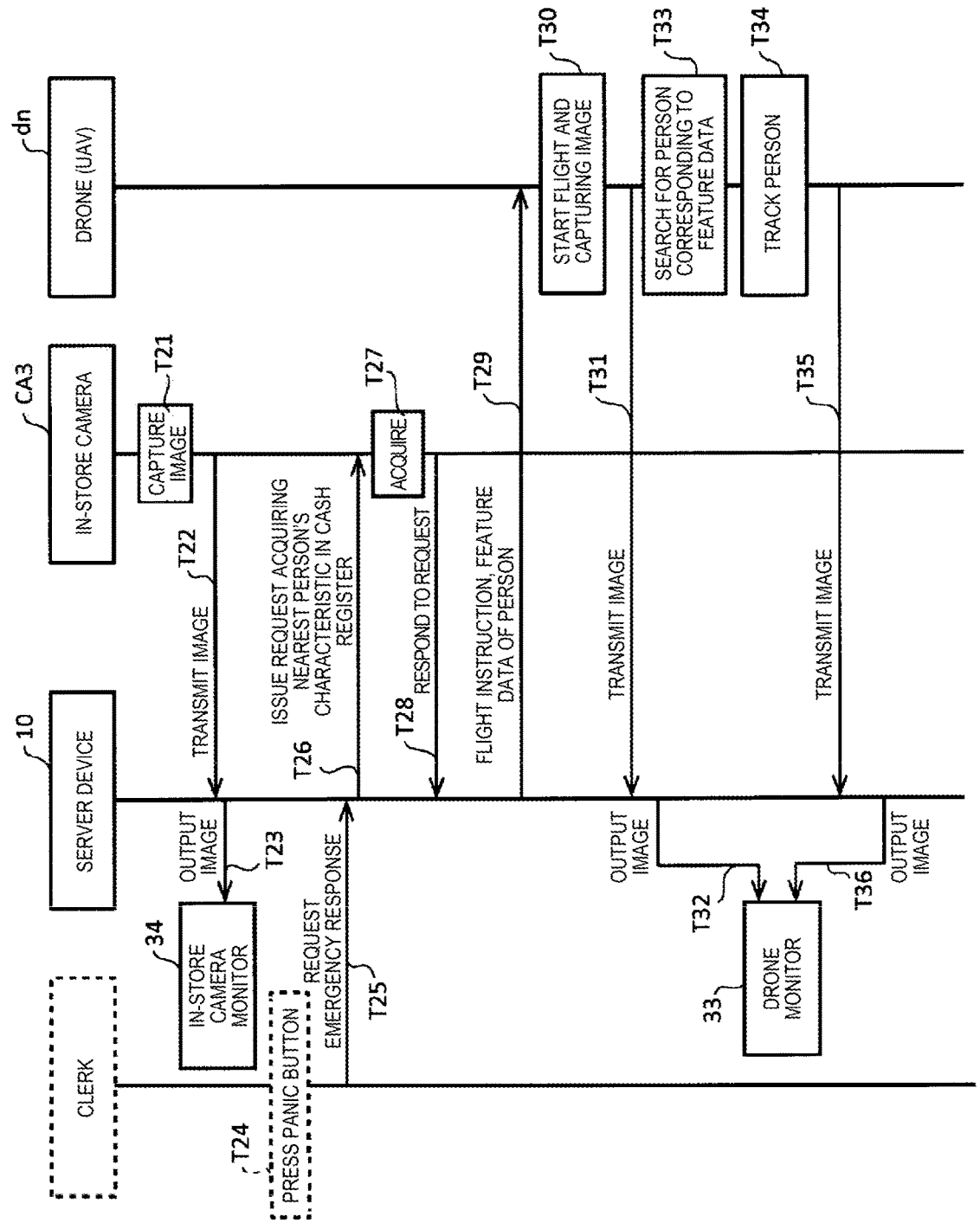
FIG. 10 is a sequence diagram showing an example of the monitoring operation procedure in the monitoring system according to Embodiment 2 in detail.

FIG. 10 is a sequence diagram showing an example of a monitoring operation procedure in monitoring system 5 of Embodiment 2 in detail.

In FIG. 10, when monitoring system 5 is activated, in-store camera CA3 starts imaging (T21). In-store camera CA3 transmits the captured image data to server device 10 (T22). Server device 10 displays the image captured by in-store camera CA3 on in-store camera monitor 34 arranged in the back yard of the shop SH (T23).

A clerk who is monitoring in the back yard checks the site near the cash register with the captured image displayed on in-store camera monitor 34, and for example, if it is determined that a robbery incident (incident) has occurred, the clerk presses panic button bn (T24) and requests emergency response to server device 10 (T25). The emergency response request may be made by analyzing the captured image transmitted from in-store camera CA3 by service device 10 without depending on pressing panic button bn. As a result of image analysis, for example, in a case where an image in which clerk hm 1 (see FIG. 9) raises his or her both hands is checked, server device 10 may determine that a robbery incident occurred and a request for emergency response was made.

When receiving an emergency response request by panic button bn being pressed, server device 10 issues a request (a request for acquiring the nearest person's characteristic in the cash register) for acquiring the characteristic of a person in the vicinity of the cash register to in-store camera CA3 (T26). In-store camera CA3 analyzes the captured image and acquires the characteristic of person hm 2 excluding clerk hm 1 as a criminal among the persons in the vicinity of the cash register (T27). The characteristic acquired here includes the color of a person's clothing, the color of a face or skin, and the like. In-store camera CA3 may perform facial recognition, extract a feature amount, and use the feature amount as a characteristic of a person. In-store camera CA3 responds to this request and returns feature data of a person representing the person's characteristic to server device 10 (T28).

When receiving this response, server device 10 transmits a flight instruction and feature data of the person to drone dn that is accommodated in the eaves of, for example, storage unit WH or shop SH and is on standby (T29). Drone dn flies in accordance with the flight instruction and starts an operation to capture the vicinity of the entrance of shop SH from the outside (T30). During flight, drone dn always transmits captured image data to server device 10 (T31). Server device 10 accumulates the image data transmitted from drone dn in data storage 62 (recorder) and displays the data on drone monitor 33 (T32).

Based on the feature data of the person transmitted from server device 10, drone dn analyzes the captured image and searches for a person corresponding to the feature data (T33). When finding a person corresponding to the feature data as a result of analysis, drone dn tracks the person (T34). While tracking the person, drone dn transmits the captured image to server device 10 (T35). While tracking, server device 10 accumulates the image data transmitted from drone dn in data storage 62 and displays the data on drone monitor 33 (T36).

In this way, according to monitoring system 5 of Embodiment 2, since drone dn captures images when the criminal of the robbery incident left the door of the store, it is possible to check the details of the criminal and easily identify the criminal. In addition, it is possible to grasp the getaway direction of the criminal.

In addition, the information on the camera is characteristic information of the subject within the angle of view of the in-store camera which captures the occurrence position of the robbery incident or the like (incident). As a result, server device 10 may inform drone dn of feature information (clothing color and the like) of a criminal (subject). Drone dn may track the criminal using this feature information.

In addition, server device 10 recognizes the occurrence of a robbery incident or the like in response to a pressing operation (button operation) of panic button bn. Thus, it is possible to easily and promptly inform server device 10 of occurrence of an incident such as a robbery incident, and usability is improved.

Although various embodiments have been described with reference to the drawings, but it goes without saying that the present disclosure is not limited to such examples. Those skilled in the art will appreciate that various modifications or modifications may be conceived within the scope described in the claims, and it is obvious that those belonging to the technical scope of the present disclosure are understood as well.

For example, in Embodiment 1, fixed camera monitors 31 and 32, and drone monitor 33 are configured as separate monitor devices, but one monitor device may be shared for screen division. Likewise, in Embodiment 2, in-store camera monitor 34 and drone monitor 33 are configured as separate monitor devices, but one monitor device may be shared for screen division.

In addition, the present disclosure provides a program realizing the functions of the monitoring system according to the above embodiments to the device via a network or various storage media, and the program read and executed by a computer in this device and a recording medium in which the program is recorded are also within an applicable range.

The present disclosure is useful as a surveillance system, a monitoring method, and a program capable of promptly checking the details of the monitoring target point in a case where an incident occurs and improve usability of the user.

What is claimed is:

1. A monitoring system comprising:
   a camera that is installed in an imaging area; and
   a server that communicates with the camera via a network,
   wherein the server, in operation, displays an image of the imaging area captured by the camera on a display, and transmits to the camera a request for camera information in response to an occurrence of an incident in the imaging area,
   wherein the camera, in operation, transmits the camera information to the server in response to the request, the camera information including camera position information of the camera and zooming position information of the camera, and
   wherein the server, in operation,
      derives an occurrence position of the incident based on the image of the imaging area captured by the camera and the camera information including the camera position information of the camera and the zooming position information of the camera transmitted from the camera,
      selects a lighting device based on the occurrence position derived based on the image of the imaging area captured by the camera and the camera information including the camera position information of the camera and the zooming position information of the camera transmitted from the camera,
      issues a lighting instruction to the lighting device selected based on the occurrence position derived based on the image of the imaging area captured by the camera and the camera information including the camera position information of the camera and the zooming position information of the camera transmitted from the camera, the lighting instruction instructing the lighting device to adjust a brightness of light emitted by the lighting device,
      issues an on-site check instruction to an unmanned aerial vehicle, the on-site check instruction instructing the unmanned aerial vehicle to capture an image of a vicinity of the occurrence position of the incident derived based on the image of the imaging area captured by the camera and the camera information including the camera position information of the camera and the zooming position information of the camera transmitted from the camera,
      acquires the image of the vicinity of the occurrence position of the incident captured by the unmanned aerial vehicle; and
      displays the image of the vicinity of the occurrence position of the incident captured by the unmanned aerial vehicle on the display.

2. The monitoring system of claim 1,
   wherein the camera information transmitted by the camera includes feature information of a subject within an angle of view of the camera.

3. The monitoring system of claim 1,
   wherein the feature information of the subject within the angle of view of the camera transmitted by the camera includes color information.

4. The monitoring system of claim 1, further comprising:
   a plurality of lighting devices including the lighting device selected by the server,
   wherein the server, in operation, selects the lighting device from among the plurality of lighting devices based on the position information of the camera indicating proximity to the occurrence position of the incident.

5. The monitoring system of claim 1,
   wherein the server, in operation, recognizes the occurrence of the incident and transmits the request for camera information to the camera in response to a predetermined button operation.

6. A monitoring method in a monitoring system which includes a camera that is installed in an imaging area and a server that communicates with the cameras via a network, the method comprising:
   displaying an image of an imaging area captured by the camera on a display;
   transmitting from the server to the camera a request for camera information in response to an occurrence of an incident in the imaging area;
   transmitting from the camera to the server the camera information in response to the request transmitted from the server, the camera information including camera position information of the camera and zooming position information of the camera;
   deriving an occurrence position of the incident based on the image of the imaging area captured by the camera and the camera information including the camera position information of the camera and the zooming position information of the camera transmitted from the camera;
   selecting a lighting device based on the occurrence position derived based on the image of the imaging area captured by the camera and the camera information including the camera position information of the camera and the zooming position information of the camera transmitted from the camera;
   issuing a lighting instruction to the lighting device selected based on the occurrence position derived based on the image of the imaging area captured by the camera and the camera information including the camera position information of the camera and the zooming position information of the camera transmitted from the camera, the lighting instruction instructing the lighting device to adjust a brightness of light emitted by the lighting device;
   issuing an on-site check instruction to an unmanned aerial vehicle, the on-site check instruction instructing the unmanned aerial vehicle to capture an image of a vicinity of the occurrence position of the incident derived based on the camera information including the camera position information of the camera and the zooming position information of the camera transmitted from the camera;
   acquiring the image of the vicinity of the occurrence position of the incident captured by the unmanned aerial vehicles; and
   displaying the image of the vicinity of the occurrence position of the incident captured by the unmanned aerial vehicle on the display.

7. A non-transitory computer readable medium storing a program that causes a computer server, which communicates with a camera installed in an imaging area via a network, to:

display an image of the imaging area captured by the camera on a display;

transmit to the camera a request for camera information in response to an occurrence of an incident in the imaging area;

receive from the camera the camera information in response to the request, the camera information including camera position information of the camera and zooming position information of the camera;

derive an occurrence position of the incident based on the image of the imaging area captured by the camera and the camera information including the camera position information of the camera and the zooming position information of the camera in response to receiving the camera information including the camera position information of the camera and the zooming position information of the camera transmitted from the camera;

select a lighting device based on the occurrence position derived based on the image of the imaging area captured by the camera and the camera information including the camera position information of the camera and the zooming position information of the camera transmitted from the camera;

issue a lighting instruction to the lighting device selected based on the occurrence position derived based on the image of the imaging area captured by the camera and the camera information including the camera position information of the camera and the zooming position information of the camera transmitted from the camera, the lighting instruction instructing the lighting device to adjust a brightness of light emitted by the lighting device, issues an on-site check instruction to an unmanned aerial vehicle, the on-site check instruction instructing the unmanned aerial vehicle to capture an image of a vicinity of the occurrence position of the incident derived based on the image of the imaging area captured by the camera and the camera information including the camera position information of the camera and the zooming position information of the camera transmitted from the camera;

acquire the image of the vicinity of the occurrence position of the incident captured by the unmanned aerial vehicle; and display the image captured in the vicinity of the occurrence position of the incident captured by the unmanned aerial vehicle on the display.

8. The computer readable medium of claim 7, wherein the camera information transmitted by the camera includes feature information of a subject within an angle of view of the camera.

9. The computer readable medium of claim 8, wherein the feature information of the subject within the angle of view of the camera transmitted by the camera includes color information.

10. The computer readable medium of claim 7, wherein the program causes the server to select the lighting device from among a plurality of lighting devices based on the position information of the camera indicating proximity to the occurrence position of the incident.

11. The computer readable medium of claim 7, wherein the program causes the server to recognize the occurrence of the incident and transmit the request for camera information to the camera in response to a predetermined button operation.

12. The computer readable medium of claim 7, wherein the program causes the server to recognize the occurrence of the incident based on the image of the imaging area captured by the camera.

13. The monitoring method of claim 6, wherein the camera information transmitted by the camera includes feature information of a subject within an angle of view of the camera.

14. The monitoring method of claim 13, wherein the feature information of the subject within the angle of view of the camera transmitted by the camera includes color information.

15. The monitoring system of claim 6, wherein the selecting includes selecting the lighting device from among a plurality of lighting devices based on the position information of the camera indicating proximity to the occurrence position of the incident.

16. The monitoring system of claim 6, further comprising:
recognizing, by the server, the occurrence of the incident in response to a predetermined button operation,
wherein the transmitting of the request for camera information to the camera is in response to the predetermined button operation.

17. The monitoring system of claim 6, further comprising:
recognizing, by the server, the occurrence of the incident based on the image of the imaging area captured by the camera.

18. The monitoring system of claim 1, wherein the server, in operation, recognizes the occurrence of the based on the image of the imaging area captured by the camera.

* * * * *